United States Patent
Matsumura

(10) Patent No.: US 10,604,160 B2
(45) Date of Patent: Mar. 31, 2020

(54) DRIVER CONDITION DETECTION SYSTEM

(71) Applicant: Toyota Jidosha Kabushiki Kaisha, Toyota-shi, Aichi-ken (JP)

(72) Inventor: Takeshi Matsumura, Numazu (JP)

(73) Assignee: Toyota Jidosha Kabushiki Kaisha, Toyota-shi Aichi-ken (JP)

(*) Notice: Subject to any disclaimer, the term of this patent is extended or adjusted under 35 U.S.C. 154(b) by 171 days.

(21) Appl. No.: 15/870,497

(22) Filed: Jan. 12, 2018

(65) Prior Publication Data

US 2018/0201276 A1    Jul. 19, 2018

(30) Foreign Application Priority Data

Jan. 18, 2017    (JP) .................... 2017-006953

(51) Int. Cl.
  *B60W 50/14*    (2012.01)
  *G06K 9/00*    (2006.01)
  *B60W 40/09*    (2012.01)
  *G06F 3/01*    (2006.01)

(52) U.S. Cl.
  CPC ............ *B60W 50/14* (2013.01); *B60W 40/09* (2013.01); *G06F 3/013* (2013.01); *G06K 9/00845* (2013.01)

(58) Field of Classification Search
  CPC ....... B60W 50/14; B60W 40/09; G06F 3/013; G06K 9/00845
  See application file for complete search history.

(56) References Cited

U.S. PATENT DOCUMENTS

| 5,859,921 | A | 1/1999 | Suzuki |
| 8,218,832 | B2* | 7/2012 | Inada ................. G06K 9/00604 340/573.1 |
| 8,239,015 | B2* | 8/2012 | Morikawa .............. A61B 5/048 600/545 |
| 2012/0057749 | A1 | 3/2012 | Takahashi et al. |

(Continued)

FOREIGN PATENT DOCUMENTS

| JP | 3093959 U | 5/2003 |
| JP | 2008037218 A | 2/2008 |

(Continued)

OTHER PUBLICATIONS

U.S. Appl. No. 15/870,485, filed Jan. 12, 2018; Inventor: Takeshi Matsumura.

(Continued)

*Primary Examiner* — Thomas Ingram
(74) *Attorney, Agent, or Firm* — Dinsmore & Shohl LLP

(57) ABSTRACT

The driver condition detection system comprises a driver monitor camera capturing a face of a driver of a vehicle to generate a facial image of the driver, a vehicle speed sensor, a facial information detection part detecting a line of sight or facial direction of the driver based on the facial image, a threshold range setting part configured to set a threshold range allowed as the line of sight or facial direction of the driver, and a driver condition judging part. The driver condition judging part is configured to judge that the driver is looking aside if the line of sight or facial direction of the driver is outside the threshold range. The threshold range setting part is configured to change the threshold range, depending on the speed of the vehicle detected by the vehicle speed sensor.

14 Claims, 7 Drawing Sheets

(56) References Cited

U.S. PATENT DOCUMENTS

| | | | | |
|---|---|---|---|---|
| 2014/0207307 A1* | 7/2014 | Jonsson | ............... | B60W 50/14 |
| | | | | 701/1 |
| 2016/0001781 A1 | 1/2016 | Fung et al. | | |
| 2017/0140232 A1 | 5/2017 | Banno et al. | | |
| 2018/0201276 A1* | 7/2018 | Matsumura | ........... | B60W 50/14 |
| 2018/0373250 A1* | 12/2018 | Nakamura | ........... | G05D 1/0088 |
| 2019/0135295 A1* | 5/2019 | Sato | ...................... | B60W 40/08 |

FOREIGN PATENT DOCUMENTS

| | | |
|---|---|---|
| JP | 2009-176112 A | 8/2009 |
| JP | 2009-244959 A | 10/2009 |
| JP | 2009294753 A | 12/2009 |
| JP | 201258769 A | 3/2012 |
| JP | 201419301 A | 2/2014 |
| WO | 2015198542 A1 | 12/2015 |

OTHER PUBLICATIONS

Non-Final Office Action dated May 23, 2019 in U.S. Appl. No. 15/870,485.

Ueno, Hiroshi et al., "Development of drowsiness detection system", IEEE, Vehicle Navigation & Information Systems Conference Proceedings, 1994, p. 15-20.

Takahashi, Hiroshi, "Various perspectives for driver support systems in Japan", IEEE, 2012, p. 1627-1632.

Shen, Jian et al., "A novel sensors-based and multiple warning early fatigue detection system architecture", IEEE, 2015 First International Conference on Computational Intelligence Theory, Systems and Applications, 2015, p. 193-196.

Itoh, Michimasa et al., "Driver's status monitor", IEEE, Proceedings of the 21st International Conference on Data Engineering, 2005, p. 1-8.

Mizuno, Nobuhiro et al., "Detecting driver's visual attention area by using vehicle-mounted device", IEEE, 16th Int'l Conf. on Cognitive Informatics & Cognitive Computing, 2017, p. 346-352.

Saito, Yuichi et al., "Driver assistance system with a dual control scheme: effectiveness of identifying driver drowsiness and preventing lane departure accidents", IEEE Transactions on Human-Machine Systems, vol. 46, No. 5, Oct. 2016, p. 660-671.

Singh, Hardeep et al., "Eye tracking based driver fatigue monitoring and warning system", IEEE, 2011, p. 1-6.

Fletcher, Luke et al. ,"Vision in and out of vehicles", IEEE Intelligent Systems, 2003, p. 12-17.

Notice of Allowance dated Sep. 18, 2019 for U.S. Appl. No. 15/870,485, filed Jan. 12, 2018 Inventor: Takeshi Matsumura.

Corrected Notice of Allowability dated Oct. 2, 2019 for U.S. Appl. No. 15/870,485, filed Jan. 12, 2018 Inventor: Takeshi Matsumura.

* cited by examiner

DRIVER CONDITION DETECTION SYSTEM

CROSS-REFERENCE TO RELATED APPLICATIONS

This application claims priority to Japanese Patent Application No. 2017-006953 filed on Jan. 18, 2017, the entire contents of which are hereby incorporated by reference.

TECHNICAL FIELD

The present disclosure relates to a driver condition detection system.

BACKGROUND ART

Known in the past has been a device for detecting a driver condition, such as inattention, using an image capturing means provided in a vehicle. For example, in the inattention judgment device described in PLT 1, the line of sight of the driver is detected from a facial image of the driver output by the image capturing means and, if the detected line of sight is outside a predetermined range, it is judged that the driver is looking aside. Further, when the vehicle is driving along a curve, the above predetermined range is changed by a predetermined amount in the direction of the curve.

CITATION LIST

Patent Literature

PLT 1: Japanese Patent Publication No. 2012-058769A
PLT 2: Japanese Patent Publication No. 2009-294753A

SUMMARY

Technical Problem

In this regard, if a host vehicle is slow in speed, there is a possibility of not only other vehicles far from the host vehicle, but also other vehicles close to the host vehicle cutting into the lane. For this reason, the slower the host vehicle in speed, the wider the range which the driver should monitor. Therefore, if setting the threshold range of the line of sight or facial direction for detecting the inattention of the driver to a constant value, it is liable to be impossible to suitably detect the inattention of the driver, depending on the speed of the host vehicle.

Therefore, an object of the present disclosure is to provide a driver condition detection system enabling suitable detection of inattention of the driver, depending on the speed of the host vehicle.

Solution to Problem

The summary of the present disclosure is as follows.

(1) A driver condition detection system comprising: a driver monitor camera capturing a face of a driver of a vehicle to generate a facial image of the driver, a vehicle speed sensor detecting a speed of the vehicle, a facial information detection part detecting a line of sight or facial direction of the driver based on the facial image, a threshold range setting part configured to set a threshold range allowed as the line of sight or facial direction of the driver, and a driver condition judging part configured to judge a condition of the driver, wherein the driver condition judging part is configured to judge that the driver is looking aside if the line of sight or facial direction of the driver detected by the facial information detection part is outside the threshold range, and the threshold range setting part is configured to change the threshold range, depending on the speed of the vehicle detected by the vehicle speed sensor.

(2) The driver condition detection system described in above (1), wherein the threshold range setting part is configured to narrow the threshold range when the speed of the vehicle detected by the vehicle speed sensor is relatively slow compared to when the speed of the vehicle is relatively fast.

(3) The driver condition detection system described in above (1), wherein the threshold range setting part is configured to broaden the threshold range when the speed of the vehicle detected by the vehicle speed sensor is relatively slow compared to when the speed of the vehicle is relatively fast.

(4) The driver condition detection system described in any one of above (1) to (3), wherein the driver condition judging part is configured to judge that the driver is looking aside if the line of sight or facial direction of the driver is outside the threshold range for a predetermined time or more.

(5) The driver condition detection system described in any one of above (1) to (4), further comprising a curve detection part configured to detect a presence and direction of a curve positioned at a front of the vehicle in a direction of advance, wherein the threshold range setting part is configured to shift the threshold range by a predetermined amount in the direction of the curve detected by the curve detection part before the vehicle enters the curve.

(6) The driver condition detection system described in above (5), wherein the curve detection part is configured to detect a radius of curvature of the curve, and the threshold range setting part is configured to increase the predetermined amount when the radius of curvature detected by the curve detection part is relatively small compared to when the radius of curvature is relatively large.

Advantageous Effects

According to the present disclosure, there is provided a driver condition detection system enabling suitable detection of inattention of the driver, depending on the speed of the host vehicle.

DESCRIPTION OF EMBODIMENTS

Figure 1:
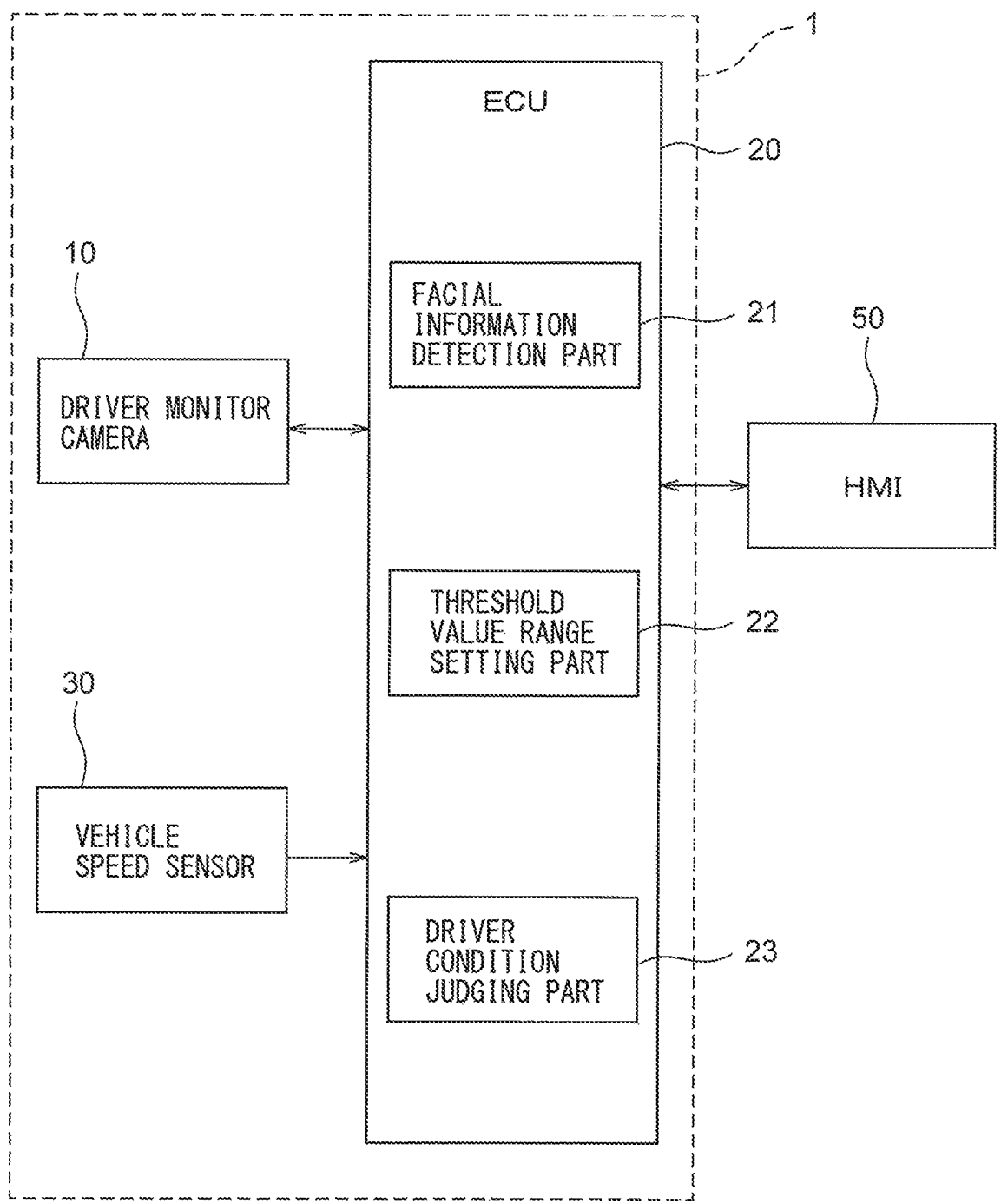
FIG. 1 is a block diagram showing the configuration of a driver condition detection system according to a first embodiment of the present disclosure.

Below, referring to the drawings, embodiments of the present disclosure will be explained in detail. Note that, in the following explanation, similar component elements are assigned the same reference numerals.

First Embodiment

Below, referring to FIG. 1 to FIG. 5, a first embodiment of the present disclosure will be explained. FIG. 1 is a block diagram showing the configuration of a driver condition detection system according to the first embodiment of the present disclosure. The driver condition detection system 1 is mounted in a vehicle and detects the condition of the driver of the vehicle. The driver condition detection system 1 is provided with a driver monitor camera 10, electronic control unit (ECU) 20, and vehicle speed sensor 30.

Figure 2:
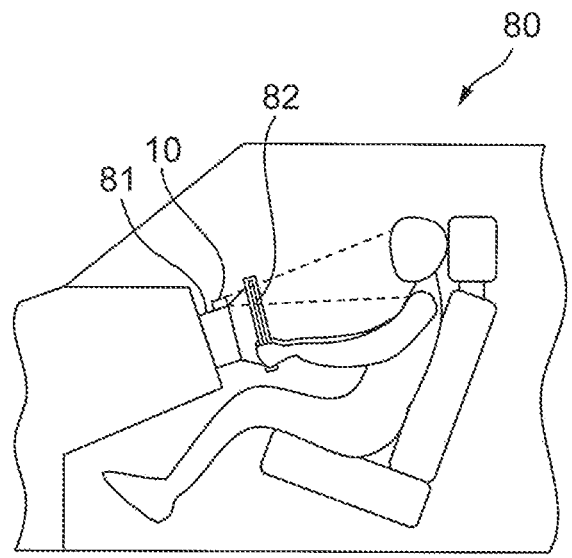
FIG. 2 is a view schematically showing an inside of a vehicle mounting the driver condition detection system.

FIG. 2 is a view schematically showing the inside of a vehicle mounting a driver condition detection system. The driver monitor camera 10 captures a face of the driver of the vehicle 80 (host vehicle) to generate a facial image of the driver. The driver monitor camera 10 is provided inside the vehicle. Specifically, as shown in FIG. 2, the driver monitor camera 10 is provided at the top of a steering wheel column 81 of the vehicle 80. FIG. 2 shows a range of projection of the driver monitor camera 10 by broken lines. Note that, the driver monitor camera 10 may be provided at the steering wheel 82, room mirror, instrument panel, instrument panel hood, etc., of the vehicle 80. Further, the driver condition detection system 1 may be provided with a plurality of the driver monitor cameras 10.

The driver monitor camera 10 is comprised of a camera and projector. For example, the camera is a CMOS (complementary metal oxide semiconductor) camera or CCD (charge coupled device) camera, while the projector is an LED (light emitting diode). Further, in order to enable the face of the driver to be captured without making the driver uncomfortable even during other low luminance time such as night, etc., in some embodiments the projector is a near-infrared LED. For example, the projector is two near-infrared LEDs arranged at the two sides of the camera. Further, the camera may be provided with a filter such as a visible light cutting filter. The facial image of the driver generated by the driver monitor camera 10 is transmitted from the driver monitor camera 10 to the ECU 20.

The vehicle speed sensor 30 is provided in the vehicle 80 and detects the speed of the vehicle 80. The speed of the vehicle 80 detected by the vehicle speed sensor 30 is transmitted from the vehicle speed sensor 30 to the ECU 20.

The ECU 20 is a microcomputer provided with components connected with each other by bidirectional buses such as a central processing unit (CPU), read only memory (ROM), random access memory (RAM), input port, and output port. In the present embodiment, one ECU 20 is provided, but a plurality of ECUs may be provided for the different functions. The ECU 20 includes a facial information detection part 21, threshold range setting part 22, and driver condition judging part 23.

The facial information detection part 21 detects the line of sight or facial direction of the driver based on the facial image of the driver generated by the driver monitor camera 10. The threshold range setting part 22 sets the threshold range allowed as the line of sight or facial direction of the driver. The driver condition judging part 23 judges the condition of the driver. Specifically, the driver condition judging part 23 judges that the driver is looking aside if the line of sight or facial direction of the driver detected by the facial information detection part 21 is outside the threshold range.

The facial information detection part 21 detects the line of sight of the driver by, for example, the following method. The facial information detection part 21 identifies a facial region from the facial image of the driver and detects facial parts by extracting feature points of facial parts such as the eyes, nose, mouth, etc. Furthermore, the facial information detection part 21 detects the position of the Purkinje image (corneal reflection image) and position of the center of the pupil, and detects the line of sight of the driver from the positional relationship of the Purkinje image and center of the pupil.

The facial information detection part 21 detects the facial direction of the driver by, for example, the following method. The facial information detection part 21 stores in advance the 3D facial shape data when the driver is facing the front. The 3D facial shape data may be data of the faces of general persons or may be acquired for each driver. The 3D facial shape data is stored, for example, in the ROM or RAM of the ECU 20. The facial information detection part 21 matches the generated facial image of the driver with the 3D facial shape data. The facial information detection part 21 rotates the facial image of the driver so that the match between the two becomes maximum, and detects the facial direction of the driver from the rotational angle at this time. Note that, facial information detection part 21 may detect the facial direction of the driver from the positional relationship between the facial region and the facial parts.

In this regard, if the vehicle 80 is slow in speed, there is a possibility of not only other vehicles far from the vehicle 80, but also other vehicles close to the vehicle 80 cutting into the lane. For this reason, the slower the vehicle 80 in speed, the wider the range which the driver should monitor. Therefore, if setting the threshold range of the line of sight or facial direction for detecting the inattention of the driver to a constant value, it is liable to be impossible to suitably detect the inattention of the driver, depending on the speed of the host vehicle. Therefore, in the present embodiment, the threshold range setting part 22 changes the threshold range, depending on the speed of the vehicle 80 detected by the vehicle speed sensor 30. Due to this, it is possible to suitably detect the inattention of the driver, depending on the speed of the host vehicle. For example, the threshold range setting part 22 changes the threshold range, depending on the speed of the vehicle 80 as follows.

There is an effective field of vision in the human eye, so when the driver is facing the right side, the left side field of vision becomes narrower, while when the driver is facing the left side, the right side field of vision becomes narrower. For this reason, in order for the driver to monitor a broad range at both the left and right sides, the driver has to face the front as much as possible. Therefore, the slower the vehicle 80 in speed, the narrower the allowable range of the line of sight or facial direction of the driver.

Based on the above finding, in the present embodiment, the threshold range setting part 22 narrows the threshold range when the speed of the vehicle 80 detected by the vehicle speed sensor 30 is relatively slow compared to when the speed of the vehicle 80 is relatively fast. By doing this, a suitable burden of monitoring corresponding to the speed of the vehicle 80 can be given to the driver.

The driver condition judging part 23 emits an alarm to the driver when judging that the driver is looking aside. For example, the driver condition judging part 23 emits a visual or audio alarm to the driver through a human-machine interface (HMI) 50. The HMI 50 is an interface for input and output of information between the driver and the vehicle 80. The HMI 50 is, for example, comprised of a display for displaying text or image information, a speaker for generating sound, operating buttons for the driver to perform an entry operation, a touch panel, microphone, etc.

Figure 3:
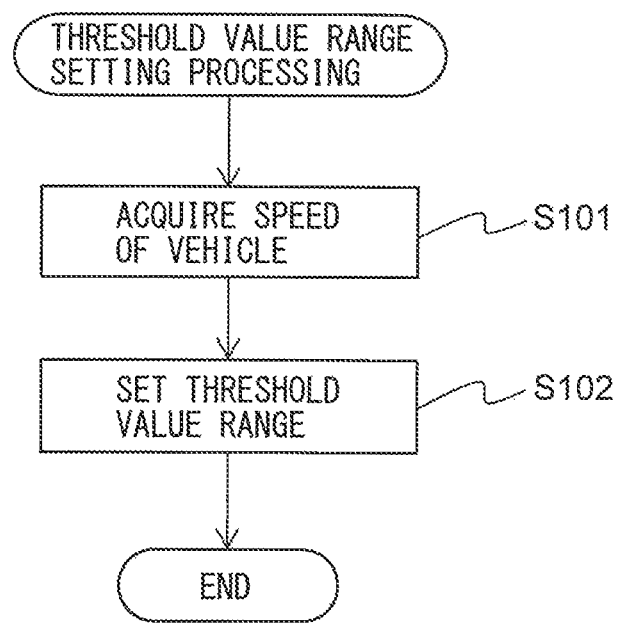
FIG. 3 is a flow chart showing a control routine of threshold range setting processing in the first embodiment.

Below, referring to the flow charts of FIG. 3 and FIG. 5, the control using the driver condition detection system 1 to detect the inattention of the will be explained in detail. FIG. 3 is a flow chart showing the control routine of threshold range setting processing in the first embodiment. The present control routine is repeatedly performed at predetermined time intervals by the ECU 20 while the vehicle 80 is being driven. In the present control routine, the threshold range of the line of sight or facial direction of the driver is set.

First, at step S101, the threshold range setting part 22 acquires the speed of the vehicle 80 from the vehicle speed sensor 30. The speed of the vehicle 80 is detected by the vehicle speed sensor 30. Next, at step S102, the threshold range setting part 22 sets the threshold range of the line of sight or facial direction of the driver. At this time, the threshold range setting part 22 narrows the threshold range when the vehicle 80 is relatively low in speed compared to when the vehicle 80 is relatively fast in speed. Note that, the threshold range setting part 22 sets the center value of the threshold range to 0° (front).

Figure 4:
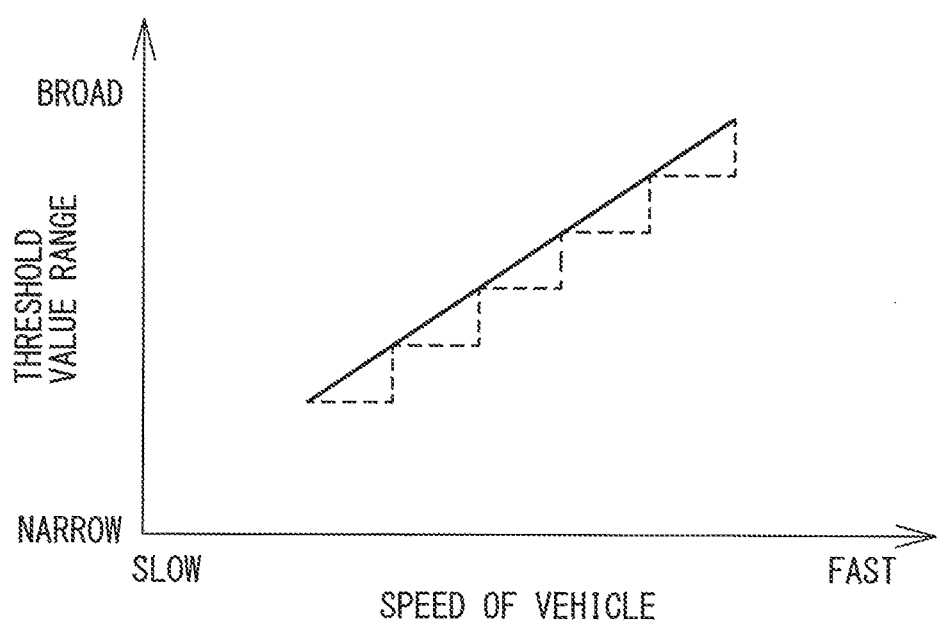
FIG. 4 is a map showing a relationship between a speed of a vehicle and a threshold range.

For example, the threshold range setting part 22 uses a map such as shown in FIG. 4 to set the threshold range. In this map, the threshold range (length) is shown as a function of the speed of the vehicle 80. The threshold range is narrowed linearly as the vehicle 80 becomes slower in speed. Note that, the threshold range, as shown in FIG. 4 by the broken line, may be narrowed in stages (in steps) as the vehicle 80 becomes slower in speed.

After step S102, the present control routine ends.

Figure 5:
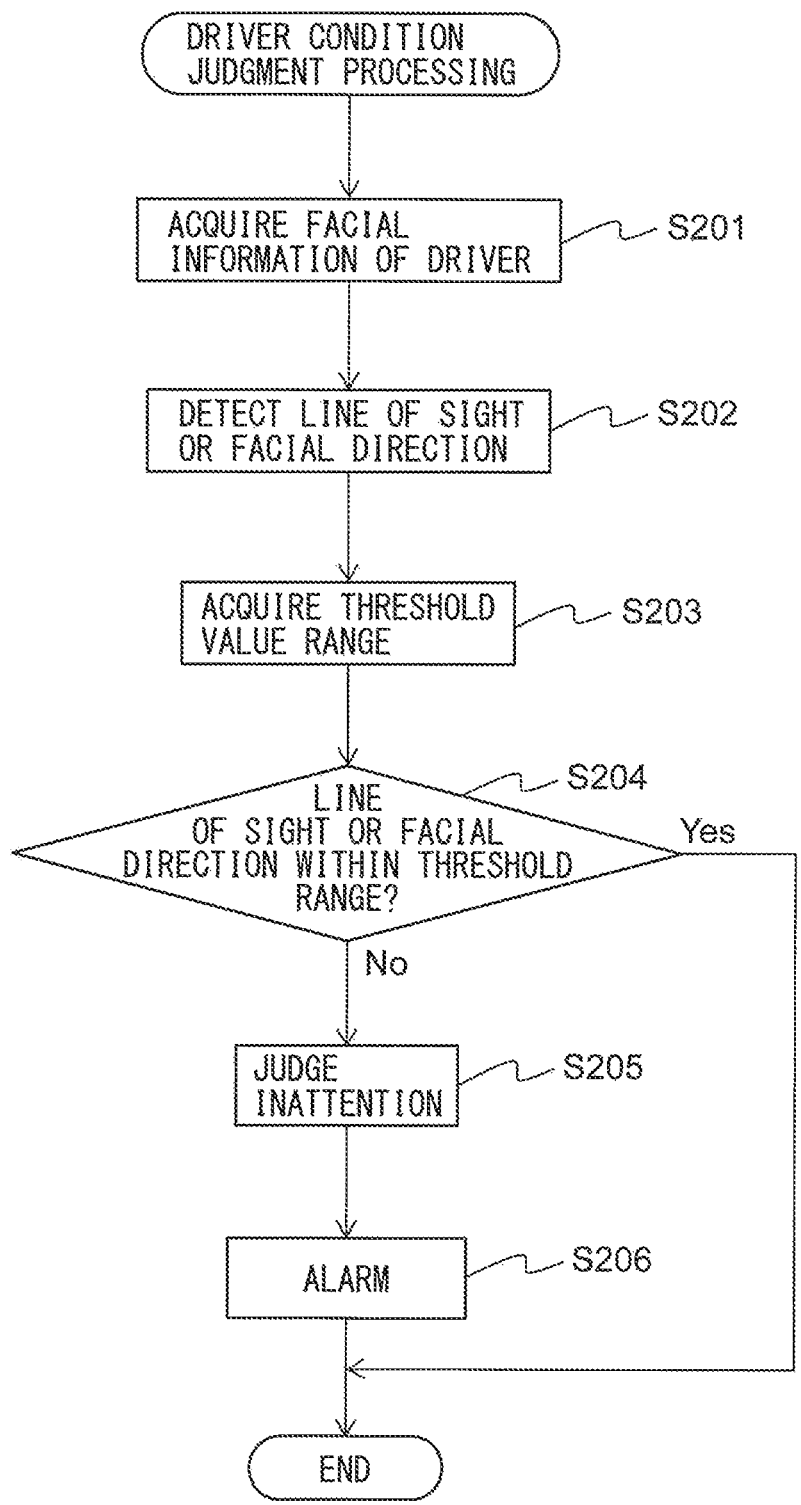
FIG. 5 is a flow chart showing a control routine of driver condition judgment processing in the first embodiment.

FIG. 5 is a flow chart showing a control routine of driver condition judgment processing of the first embodiment. The present control routine is repeatedly performed by the ECU 20 while the vehicle 80 is being driven. In the present control routine, it is judged whether the driver is looking aside while the vehicle 80 is being driven.

First, at step S201, the facial information detection part 21 acquires the facial image of the driver from the driver monitor camera 10. The facial image of the driver is generated by the driver monitor camera 10.

Next, at step S202, the facial information detection part 21 detects the line of sight or facial direction of the driver based on the facial image of the driver. For example, the facial information detection part 21 detects the line of sight or facial direction of the driver by the above-mentioned method.

Next, at step S203, the driver condition judging part 23 acquires the threshold range of the line of sight or facial direction of the driver from the threshold range setting part 22. The threshold range of the line of sight or facial direction of the driver is set by the threshold range setting part 22 at step S102 of FIG. 3.

Next, at step S204, the driver condition judging part 23 judges whether the line of sight or facial direction of the driver is in the threshold range. If it is judged that the line of sight or facial direction of the driver is in the threshold range, it is considered that the driver is not looking aside, so the present control routine is ended. On the other hand, if it is judged that the line of sight or facial direction of the driver is outside the threshold range, the present control routine proceeds to step S205.

At step S205, the driver condition judging part 23 judges that driver is looking aside. Next, at step S206, the driver condition judging part 23 emits an alarm to the driver. For example, the driver condition judging part 23 emits a visual or audio alarm to the driver through the HMI 50. After step S206, the present control routine is ended. Note that, even if the fact that the driver is looking aside is not clearly notified, when an alarm is emitted to the driver, it can be said that it is substantially judged that the driver is looking aside.

Further, the driver will sometimes turn his face in the direction of another vehicle in order to predict the behavior of the other vehicle when another vehicle driving in another lane is close to the host vehicle. At this time, if the threshold range of the line of sight or facial direction is narrow, a mistaken alarm will be emitted to the driver who is suitably monitoring the surroundings and the driver is liable to be given an unpleasant feeling. As explained above, if the vehicle 80 is slow in speed, the range which the driver should monitor becomes broader, so when monitoring other vehicles, the line of sight or facial direction of the driver will sometimes greatly deviate from the front (0°). For this reason, to reduce mistaken alarms emitted to the driver, the threshold range setting part 22 may broaden the threshold range when the vehicle 80 is relatively slow in speed compared to when the vehicle 80 is relatively fast in speed. In this case, the threshold range is broadened linearly or in stages (in steps) as the vehicle 80 becomes slower in speed.

Second Embodiment

The configuration and control of the driver condition detection system according to the second embodiment basically are similar to the configuration and control of the driver condition detection system according to the first embodiment except for the points explained below. For this reason, below, in the second embodiment of the present disclosure, primarily the parts different from the first embodiment will be explained.

A typical driver turns his head greatly to the left and right at a crossroad etc., so as to check the surroundings. As a result, sometimes the line of sight or facial direction of the driver will be outside the threshold range for an instant. However, this action increases the awareness of surroundings, and therefore it may not be desirable in some embodiments that such an action be judged as inattention and an alarm being emitted to the driver.

Therefore, in the second embodiment, the driver condition judging part 23 judges that the driver is looking aside if the line of sight or facial direction of the driver is outside the threshold range for a predetermined time or more. The predetermined time is set so as to become longer than the time during which turning of the head for confirmation of the surroundings results in the line of sight or facial direction of the driver being maintained outside of the threshold range. As a result, in the second embodiment, it is possible to more precisely detect that the driver is looking aside.

Figure 6:
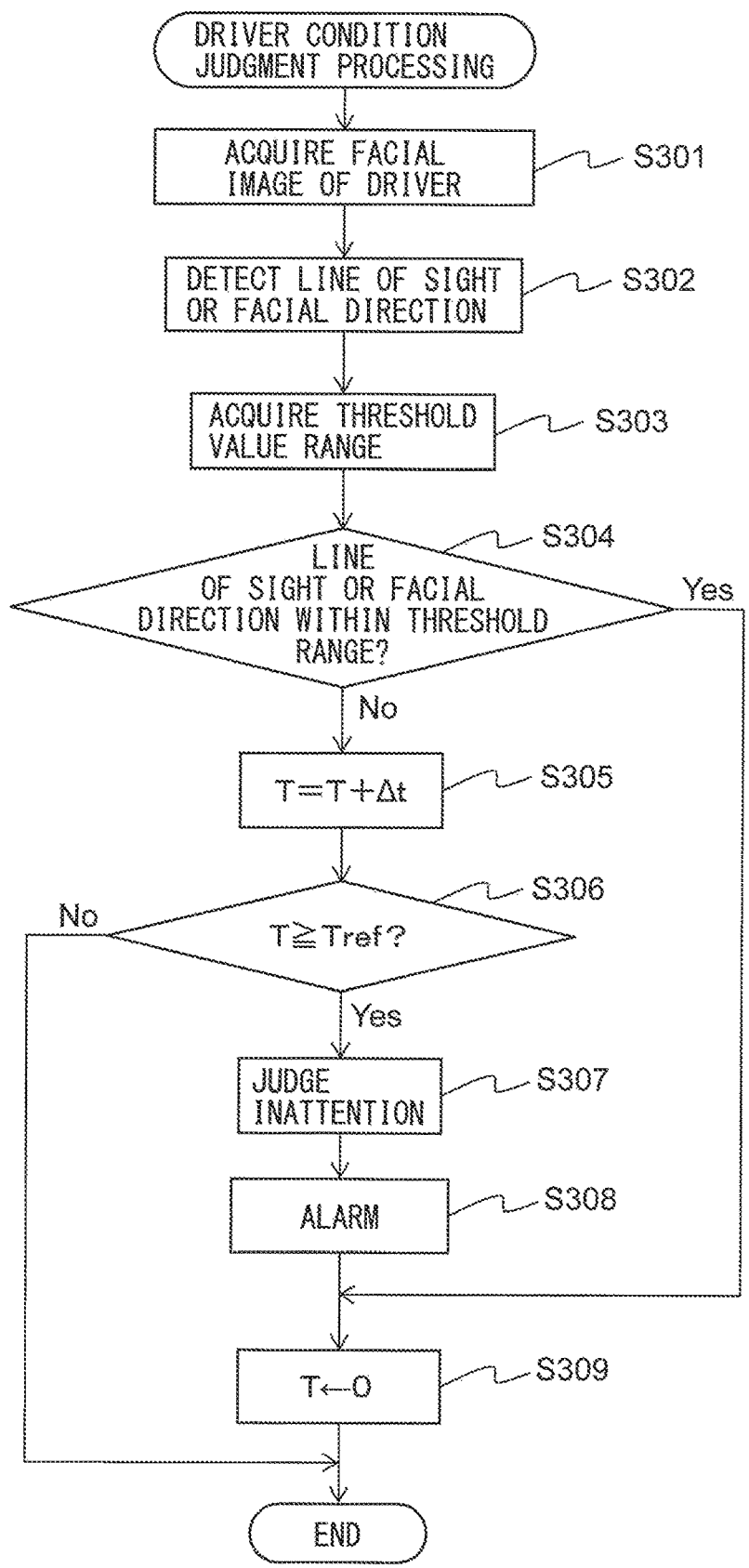
FIG. 6 is a flow chart showing a control routine of driver condition judgment processing in a second embodiment.

FIG. 6 is a flow chart showing a control routine of the driver condition judgment processing in the second embodiment. The present control routine is repeatedly performed by the ECU 20 while the vehicle 80 is being driven. In the present control routine, it is judged whether the driver is looking aside while the vehicle 80 is being driven. Step S301 to step S304 are similar to step S201 to step S204 of FIG. 5, so the explanations will be omitted.

The present control routine proceeds to step S305 when at step S304 it is judged that the line of sight or facial direction of the driver is outside the threshold range. At step S305, the driver condition judging part 23 updates the cumulative time T. Specifically, the driver condition judging part 23 makes the value of the cumulative time T plus an incremental time Δt the new cumulative time T. The cumulative time T is the total of the time during which the line of sight or facial direction of the driver is maintained outside of the threshold range. The initial value of the cumulative time T is zero. Further, the incremental time Δt is a value corresponding to the interval of execution of the present control routine.

Next, at step S306, the driver condition judging part 23 judges whether the cumulative time T is a predetermined time Tref or more. The predetermined time Tref is, for example, 2 to 5 seconds. If at step S306 it is judged that the cumulative time T is less than the predetermined time Tref, the driver is considered to be not looking aside, so the present control routine is ended. On the other hand, if at step S306 it is judged that the cumulative time T is the predetermined time Tref or more, the present control routine proceeds to step S307.

At step S307, the driver condition judging part 23 judges that driver is looking aside. Next, at step S308, in the same way as step S206 of FIG. 5, the driver condition judging part 23 emits an alarm to the driver. Next, at step S309, the driver condition judging part 23 resets the cumulative time T to zero. After step S309, the present control routine is ended.

On the other hand, if at step S304 it is judged that the line of sight or facial direction of the driver is within the threshold range, the present control routine proceeds to step S309. At step S309, the driver condition judging part 23 resets the cumulative time T to zero. After step S309, the present control routine is ended.

Third Embodiment

The configuration and control of the driver condition detection system according to the third embodiment basically are similar to the configuration and control of the driver condition detection system according to the first embodiment except for the points explained below. For this reason, below, in the third embodiment of the present disclosure, primarily the parts different from the first embodiment will be explained.

The driver condition detection system needs to detect that the driver is looking aside not only when the vehicle 80 is being driven straight ahead, but also when the vehicle 80 is turning. When the vehicle 80 is driven along a curve, the driver needs to shift his line of sight and facial direction from the front and look ahead in the curve in order to check the surroundings of the road ahead. However, the threshold range of the line of sight or facial direction is usually set centered about 0° (front). For this reason, despite the driver looking ahead in the curve in order to check the surroundings, sometimes the line of sight or facial direction of the driver becomes outside the threshold range and an alarm is emitted to the driver.

Figure 7:
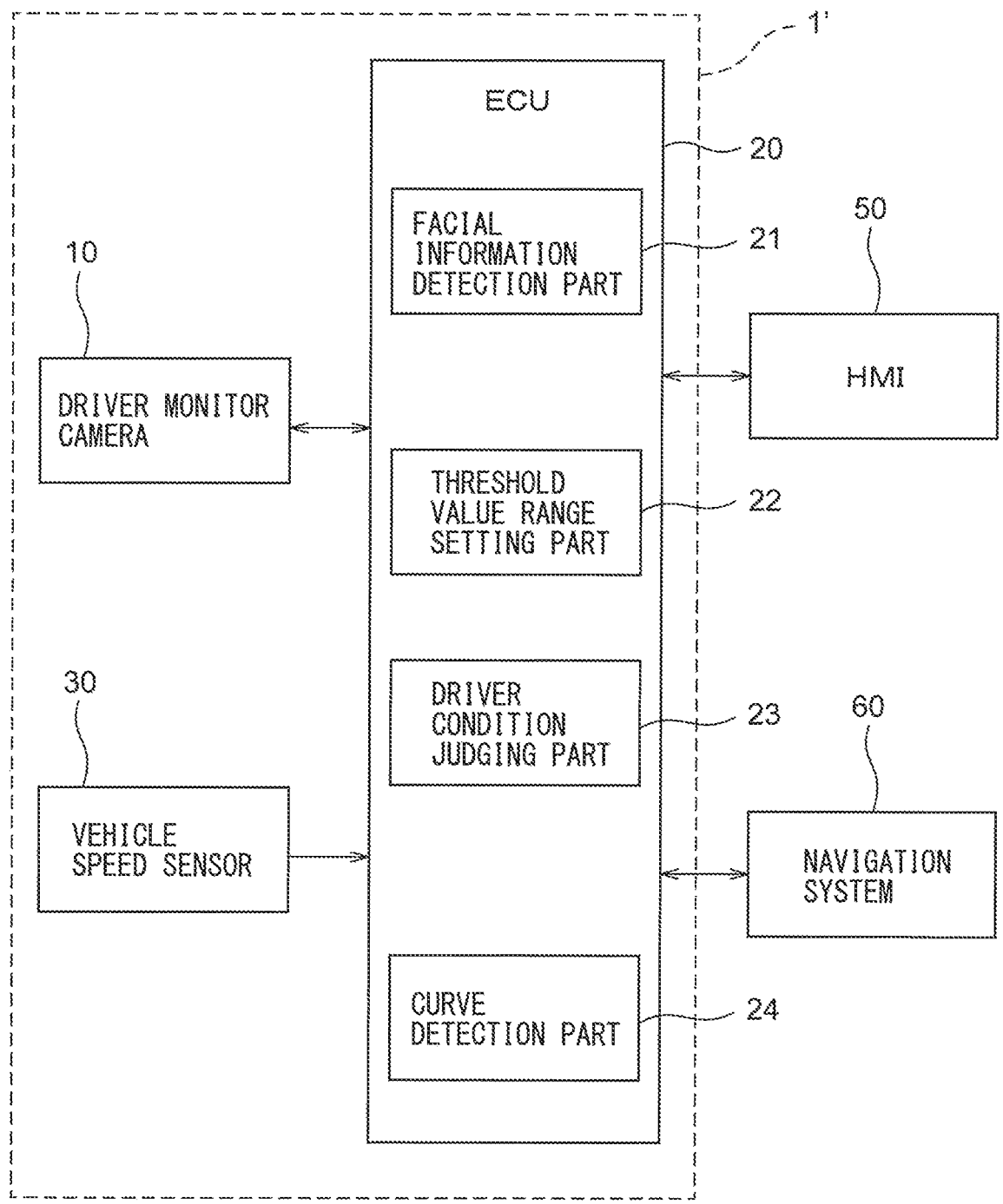
FIG. 7 is a block diagram showing the configuration of a driver condition detection system according to a third embodiment of the present disclosure.

Therefore, in the third embodiment, to avoid false judgment that the driver is looking aside at the time of turning of the vehicle 80, the threshold range of the line of sight or facial direction of the driver is set considering the route of the vehicle 80. FIG. 7 is a block diagram showing the configuration of the driver condition detection system according to the third embodiment of the present disclosure. The driver condition detection system 1' is provided with a driver monitor camera 10, electronic control unit (ECU) 20, and vehicle speed sensor 30. The ECU 20 includes a facial information detection part 21, threshold range setting part 22, driver condition judging part 23, and curve detection part 24. Further, the vehicle 80 is provided with a navigation system 60.

The navigation system 60 has a GPS receiver and uses the GPS receiver to detect the current position of the vehicle 80. Further, the navigation system 60 stores map information. The map information includes positional information of roads, shape information of roads (for example, curved or straight, radius of curvature of curves, etc.), positional information of intersections and branch points, types of roads, and other information.

The curve detection part 24 detects the presence and direction of a curve positioned in front of the vehicle 80 in the direction of advance. For example, the curve detection part 24 detects the presence and direction of a curve positioned in front of the vehicle 80 in the direction of advance based on information acquired from the navigation system 60. Note that, the curve detection part 24 may detect these based on information received from outside the vehicle 80.

The driver usually moves the line of sight and facial direction in the direction of the curve before the vehicle 80 enters the curve. For this reason, the threshold range setting part 22 shifts the threshold range of the line of sight or facial direction of the driver by a predetermined amount in the direction of the curve detected by the curve detection part 24 before the vehicle 80 enters the curve. Due to this, even if the vehicle 80 is driving on a curve, it is possible to precisely detect that the driver is looking aside.

Further, the smaller the radius of curvature of the curve, the sharper the bend of the curve, so the greater the amount of movement of the line of sight and facial direction of the driver. For this reason, the curve detection part 24 detects the radius of curvature of the curve, and the threshold range setting part 22 increases the predetermined amount when the radius of curvature detected by the curve detection part 24 is relatively small compared to when the radius of curvature is relatively large. By doing this, the threshold range is set to a value corresponding to the radius of curvature of the curve, so it is possible to more precisely detect that the driver is looking aside while driving along a curve.

Figure 8:
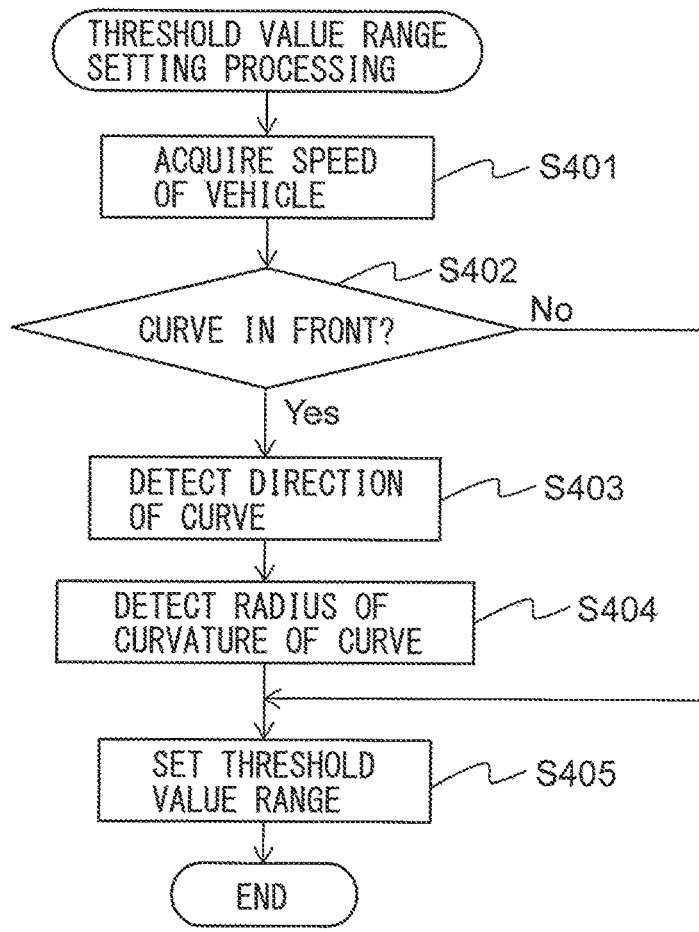
FIG. 8 is a flow chart showing a control routine of threshold range setting processing in a third embodiment.

FIG. 8 is a flow chart showing a control routine of threshold range setting processing in the third embodiment. The present control routine is repeatedly performed by the ECU 20 at predetermined time intervals while the vehicle 80 is being driven. In the present control routine, the threshold range of the line of sight or facial direction of the driver is set.

First, at step S401, in the same way as step S101 of FIG. 3, the threshold range setting part 22 acquires the speed of the vehicle 80 from the vehicle speed sensor 30. Next, at step S402, the curve detection part 24 judges whether there is a curve within a predetermined distance in front of the vehicle 80 in the direction of advance. If it is judged that there is no curve, the present control routine proceeds to step S405.

At step S405, the threshold range setting part 22 sets the threshold range of the line of sight or facial direction of the driver in the same way as step S102 of FIG. 3. After step S405, the present control routine is ended.

On the other hand, if at step S402 it is judged that there is a curve, the present control routine proceeds to step S403. At step S403, the curve detection part 24 detects the direction of the curve. Next, at step S404, the curve detection part 24 detects the radius of curvature of the curve.

Next, at step S405, the threshold range setting part 22 sets the threshold range of the line of sight or facial direction of the driver. At this time, the threshold range setting part 22 makes the threshold range narrower when the speed of the vehicle 80 is relatively slow compared to when the speed of the vehicle 80 is relatively fast. Further, the threshold range setting part 22 shifts the threshold range of the line of sight or facial direction of the driver in the direction of the curve detected at step S403 by a predetermined amount. For example, the threshold range setting part 22 shifts the center value of the threshold range in the direction of the curve by a predetermined amount. The predetermined amount is made larger when the radius of curvature detected at step S404 is relatively small compared to when the radius of curvature is relatively large.

Figure 9:
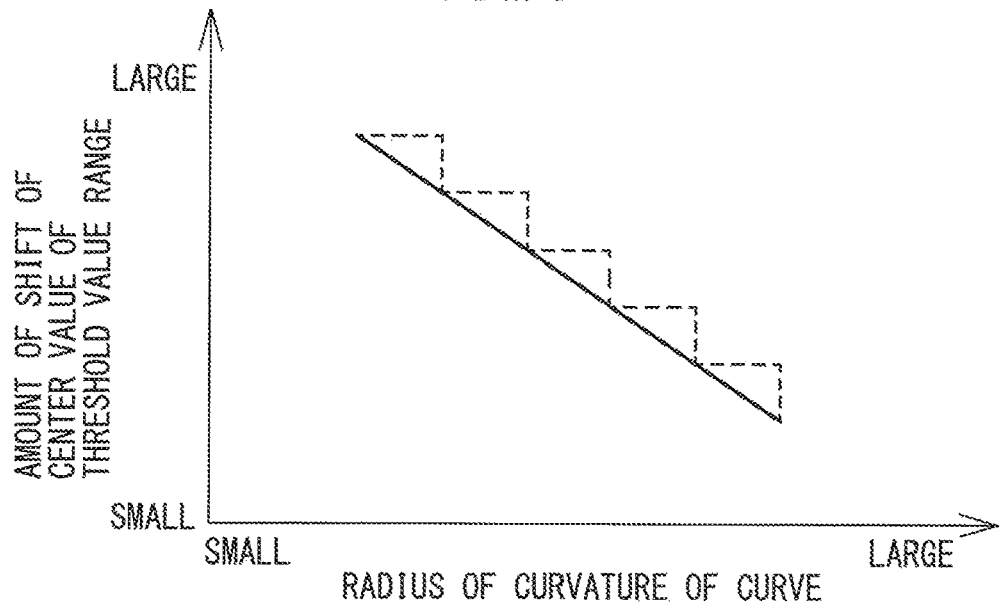
FIG. 9 is a map showing a relationship between a radius of curvature of a curve and an amount of shift of a center value of the threshold range.

For example, the threshold range setting part 22 uses a map such as shown in FIG. 9 to set the amount of shift of the center value of the threshold range. In this map, the amount of shift of the center value of the threshold range is shown as a function of the radius of curvature of the curve. The amount of shift of the center value of the threshold range is increased linearly as the radius of curvature becomes smaller. Note that, the amount of shift of the center value of the threshold range, as shown by the broken line in FIG. 9, may be made larger in stages (in steps) as the radius of curvature becomes smaller. For example, if the direction of the curve is to the right and the radius of curvature of the curve is 500 meters, the center value of the threshold range is set to +5°. On the other hand, if the direction of the curve is to the left and the radius of curvature of the curve is 300 meters, the center value of the threshold range is set to −8°. After step S405, the present control routine ends.

Note that, step S404 may be omitted. In this case, at step S405 after step S403, the amount of shift of the center value of the threshold range is set to a predetermined fixed value.

Further, in the third embodiment as well, the control routine of the driver condition judgment processing of FIG. 5 is performed. At this time, at step S203, the threshold range set at step S405 of FIG. 8 is acquired.

Above, embodiments were explained, but the present disclosure is not limited to these embodiments and can be corrected and changed in various ways within the language of the claims. Further, the above embodiments can be worked in any combination. For example, in the third embodiment, the control routine of the driver condition judgment processing of FIG. 6 may be performed.

The invention claimed is:

1. A driver condition detection system comprising:
a driver monitor camera capturing a face of a driver of a vehicle to generate a facial image of the driver,
a vehicle speed sensor detecting a speed of the vehicle,
a facial information detection part detecting a line of sight or facial direction of the driver based on the facial image,
a threshold range setting part configured to set a threshold range allowed as the line of sight or facial direction of the driver, and
a driver condition judging part configured to judge a condition of the driver, wherein
the driver condition judging part is configured to judge that the driver is looking aside if the line of sight or facial direction of the driver detected by the facial information detection part is outside the threshold range, and
the threshold range setting part is configured to change the threshold range, depending on the speed of the vehicle detected by the vehicle speed sensor.

2. The driver condition detection system according to claim 1, wherein the threshold range setting part is configured to narrow the threshold range when the speed of the vehicle detected by the vehicle speed sensor is relatively slow compared to when the speed of the vehicle is relatively fast.

3. The driver condition detection system according to claim 2, wherein the driver condition judging part is configured to judge that the driver is looking aside if the line of sight or facial direction of the driver is outside the threshold range for a predetermined time or more.

4. The driver condition detection system according to claim 2,
further comprising a curve detection part configured to detect a presence and direction of a curve positioned at a front of the vehicle in a direction of advance, wherein
the threshold range setting part is configured to shift the threshold range by a predetermined amount in the direction of the curve detected by the curve detection part before the vehicle enters the curve.

5. The driver condition detection system according to claim 4, wherein
the curve detection part is configured to detect a radius of curvature of the curve, and
the threshold range setting part is configured to increase the predetermined amount when the radius of curvature detected by the curve detection part is relatively small compared to when the radius of curvature is relatively large.

6. The driver condition detection system according to claim 1, wherein the threshold range setting part is configured to broaden the threshold range when the speed of the vehicle detected by the vehicle speed sensor is relatively slow compared to when the speed of the vehicle is relatively fast.

7. The driver condition detection system according to claim 6, wherein the driver condition judging part is configured to judge that the driver is looking aside if the line of sight or facial direction of the driver is outside the threshold range for a predetermined time or more.

8. The driver condition detection system according to claim 6,
further comprising a curve detection part configured to detect a presence and direction of a curve positioned at a front of the vehicle in a direction of advance, wherein
the threshold range setting part is configured to shift the threshold range by a predetermined amount in the direction of the curve detected by the curve detection part before the vehicle enters the curve.

9. The driver condition detection system according to claim 8, wherein
the curve detection part is configured to detect a radius of curvature of the curve, and
the threshold range setting part is configured to increase the predetermined amount when the radius of curvature detected by the curve detection part is relatively small compared to when the radius of curvature is relatively large.

10. The driver condition detection system according to claim 1, wherein the driver condition judging part is configured to judge that the driver is looking aside if the line of sight or facial direction of the driver is outside the threshold range for a predetermined time or more.

11. The driver condition detection system according to claim 10,
further comprising a curve detection part configured to detect a presence and direction of a curve positioned at a front of the vehicle in a direction of advance, wherein the threshold range setting part is configured to shift the threshold range by a predetermined amount in the direction of the curve detected by the curve detection part before the vehicle enters the curve.

12. The driver condition detection system according to claim 11, wherein
the curve detection part is configured to detect a radius of curvature of the curve, and
the threshold range setting part is configured to increase the predetermined amount when the radius of curvature detected by the curve detection part is relatively small compared to when the radius of curvature is relatively large.

13. The driver condition detection system according to claim 1,
further comprising a curve detection part configured to detect a presence and direction of a curve positioned at a front of the vehicle in a direction of advance, wherein
the threshold range setting part is configured to shift the threshold range by a predetermined amount in the direction of the curve detected by the curve detection part before the vehicle enters the curve.

14. The driver condition detection system according to claim 13, wherein
the curve detection part is configured to detect a radius of curvature of the curve, and
the threshold range setting part is configured to increase the predetermined amount when the radius of curvature detected by the curve detection part is relatively small compared to when the radius of curvature is relatively large.

* * * * *

UNITED STATES PATENT AND TRADEMARK OFFICE
CERTIFICATE OF CORRECTION

PATENT NO. : 10,604,160 B2
APPLICATION NO. : 15/870497
DATED : March 31, 2020
INVENTOR(S) : Takeshi Matsumura Page 1 of 1

It is certified that error appears in the above-identified patent and that said Letters Patent is hereby corrected as shown below:

On the Title Page

Item (72), inventor, city, delete "Numazu" and insert --Numazu-shi Shizuoka-ken--, therefor.

Signed and Sealed this
Nineteenth Day of May, 2020

Andrei Iancu
*Director of the United States Patent and Trademark Office*